United States Patent
Zhang et al.

(10) Patent No.: US 12,071,820 B2
(45) Date of Patent: Aug. 27, 2024

(54) HIGH-TEMPERATURE AND HIGH-PRESSURE SIMULATOR FOR DEEP IN-SITU ENVIRONMENT

(71) Applicant: SICHUAN UNIVERSITY, Chengdu (CN)

(72) Inventors: Ru Zhang, Chengdu (CN); Heping Xie, Chengdu (CN); Zetian Zhang, Chengdu (CN); Li Ren, Chengdu (CN); Zhilong Zhang, Chengdu (CN); Yihang Li, Chengdu (CN); Weiqiang Ling, Chengdu (CN); Heng Gao, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/031,628

(22) PCT Filed: Aug. 22, 2022

(86) PCT No.: PCT/CN2022/113824
§ 371 (c)(1),
(2) Date: Apr. 13, 2023

(87) PCT Pub. No.: WO2023/051089
PCT Pub. Date: Apr. 6, 2023

(65) Prior Publication Data
US 2023/0383629 A1   Nov. 30, 2023

(30) Foreign Application Priority Data

Sep. 30, 2021   (CN) ............................ 202111161456.2

(51) Int. Cl.
*E21B 19/16*   (2006.01)
*E21B 49/02*   (2006.01)
(Continued)

(52) U.S. Cl.
CPC ......... *E21B 19/165* (2013.01); *G01M 99/002* (2013.01); *G01N 3/12* (2013.01);
(Continued)

(58) Field of Classification Search
CPC ........ E21B 19/165; E21B 25/00; E21B 49/02; E21B 49/00; G01M 99/002; G01N 3/12;
(Continued)

(56) References Cited

U.S. PATENT DOCUMENTS

| 2004/0160858 A1 | 8/2004 | Ciglenec et al. |
| 2005/0150273 A1 | 7/2005 | Potter |

(Continued)

FOREIGN PATENT DOCUMENTS

| CN | 103806907 A | 5/2014 |
| CN | 209261522 U | 8/2019 |

(Continued)

*Primary Examiner* — Jonathan M Dunlap
(74) *Attorney, Agent, or Firm* — Bayramoglu Law Offices LLC

(57) ABSTRACT

A high-temperature and high-pressure simulator for a deep in-situ environment is provided. The simulator includes a high-fidelity sample chamber, where a lower end of the high-fidelity sample chamber is provided with a bottom cylinder. A lower end of the bottom cylinder is provided on a base. A piston rod of the bottom cylinder extends into the high-fidelity sample chamber, and an upper end of the piston rod is provided with a rock sample seat. An upper end of the high-fidelity sample chamber is provided with a rock sample cap. The top of the high-fidelity sample chamber is sealed by an end cap of the high-fidelity sample chamber. An upper end of the end cap of the high-fidelity sample chamber is provided with a multi-section coring drill chamber. The uppermost section of the coring drill chamber is connected to a lift cylinder.

10 Claims, 4 Drawing Sheets

(51) Int. Cl.
*G01M 99/00* (2011.01)
*G01N 3/12* (2006.01)
*G09B 25/02* (2006.01)

(52) U.S. Cl.
CPC ...... *E21B 49/02* (2013.01); *G01N 2203/0232* (2013.01); *G01N 2203/0266* (2013.01); *G09B 25/02* (2013.01)

(58) Field of Classification Search
CPC ... G01N 2203/0232; G01N 2203/0266; G09B 25/02
See application file for complete search history.

(56) References Cited

U.S. PATENT DOCUMENTS

| | | |
|---|---|---|
| 2005/0199393 A1 | 9/2005 | Goldberg et al. |
| 2016/0040512 A1 | 2/2016 | Burghardt |
| 2020/0182000 A1* | 6/2020 | Xie .................. E21B 25/10 |

FOREIGN PATENT DOCUMENTS

| | | | |
|---|---|---|---|
| CN | 111458184 A | 7/2020 | |
| CN | 111734332 A | 10/2020 | |
| CN | 212458949 U | 2/2021 | |
| CN | 212716508 U | 3/2021 | |
| CN | 113029793 A | 6/2021 | |
| CN | 113175307 A | 7/2021 | |
| CN | 113803010 A | 12/2021 | |
| WO | WO-2020133726 A1 * | 7/2020 | ............. E21B 10/02 |

\* cited by examiner

HIGH-TEMPERATURE AND HIGH-PRESSURE SIMULATOR FOR DEEP IN-SITU ENVIRONMENT

CROSS REFERENCE TO THE RELATED APPLICATIONS

This application is the national phase entry of International Application No. PCT/CN2022/113824, filed on Aug. 22, 2022, which is based upon and claims priority to Chinese Patent Application No. 202111161456.2, filed on Sep. 30, 2021, the entire contents of which are incorporated herein by reference.

TECHNICAL FIELD

The present disclosure relates to the technical field of deep in-situ coring, in particular, to a high-temperature and high-pressure simulator for a deep in-situ environment.

BACKGROUND

In European and American countries, energy resources are generally buried at a depth of less than 2,000 m. In contrast, in China, more than 70% of the energy resources are buried at a depth of more than 2,000 m. In China, shallow energy resources have been exhausted, and energy resources go deeper at a rate of more than 10 m every year. China is exploiting oil and gas resources at a depth of 8,418 m, and its dependence on foreign oil imports has reached 67% (in 2017), far exceeding the internationally recognized energy security warning level (50%).

Before the deep in-situ coring system is applied to on-site scientific drilling, it is necessary to carry out laboratory simulation to effectively verify the feasibility of the equipment and calibrate relevant parameters. This requires simulating the characteristics of deep in-situ rocks in the ground to conduct parameter research and debugging of the drilling equipment before on-site scientific drilling. However, this technology is still unavailable at home and abroad. Given this, it is necessary to design a high-temperature and high-pressure simulator for a deep in-situ environment to simulate the deep underground environment.

SUMMARY

To overcome the above shortcomings of the prior art, the present disclosure provides a high-temperature and high-pressure simulator with a stable structure for a deep in-situ environment.

To achieve the above objective, the present disclosure adopts the following technical solution:

The high-temperature and high-pressure simulator for a deep in-situ environment includes a high-fidelity sample chamber. A lower end of the high-fidelity sample chamber is provided with a bottom cylinder. A lower end of the bottom cylinder is provided on a base. A piston rod of the bottom cylinder extends into the high-fidelity sample chamber, and an upper end of the piston rod is provided with a rock sample seat. An upper end of the high-fidelity sample chamber is provided with a rock sample cap. The top of the high-fidelity sample chamber is sealed by an end cap of the high-fidelity sample chamber. An upper end of the end cap of the high-fidelity sample chamber is provided with a multi-section coring drill chamber. The uppermost section of the coring drill chamber is connected to a lift cylinder. A coring drill is provided in the coring drill chamber and extends into the high-fidelity sample chamber through a central end cap. The upper end of the lift cylinder is sealed by an upper end cap. The lift cylinder is provided therein with a lift rod. The lift rod has a lower end provided with a lift piston and fixedly connected to an upper end of the coring drill and an upper end passing through the upper end cap.

Further, the upper end of the lift cylinder is provided with a step for placing the upper end cap. A lower end of the upper end cap is inserted into the lift cylinder. A sealing ring is provided between the lower end of the upper end cap and the side surface of the step. The upper end cap is clamped with the upper end of the lift cylinder through a C-shaped clip.

Further, the upper end of the coring drill is provided with an expansion part. An upper end of the expansion part is provided with a stepped connection piece. An upper end of the connection piece is provided with a connection space. The connection piece is inserted into a lower end of the connection space, and a lower end of the lift rod is inserted into the connection space.

Further, the outer circumference of the lift piston is provided with a sealing ring, and the sealing ring is mated with an inner wall of the lift cylinder and nested in a limit groove of the lift piston.

Further, adjacent upper and lower ends of each two adjacent sections of the coring drill chamber, as well as an upper end of the uppermost section of the coring drill chamber and a lower end of the lift cylinder, and the central end cap and the high-fidelity sample chamber, are clamped with each other through a C-shaped clip.

Further, an upper end of the central end cap is provided with a mounting surface. A lower end of the lowermost section of the coring drill chamber is fixed on the mounting surface. A central part of the mounting surface is provided with a first convex ring extending into the coring drill chamber, and a sealing ring is provided between a side surface of the first convex ring and an inner wall of the coring drill chamber.

Further, a lower surface of the central end cap is provided with an annular groove. A central part of the annular groove is provided with a second convex ring extending into a limit groove starting from the upper end of the rock sample cap. The upper end of the high-fidelity sample chamber is provided with a third convex ring extending into the annular groove, and a sealing ring is provided between a side surface of the third convex ring and a side surface of the annular groove.

Further, an upper end of the base is provided with a boss inserted into the bottom cylinder. A lower end of the piston rod is provided with a cylinder piston. A sealing ring is provided between the cylinder piston and the inner wall of the bottom cylinder as well as between the boss and the inner wall of the bottom cylinder.

Further, the upper end of the piston rod is inserted into a slot provided at the lower end of the rock sample seat, and the piston rod is in interference fit with the slot.

Further, the high-fidelity sample chamber is provided therein with multiple sensors, such as an acoustic emission sensor, transverse ultrasonic sensor, longitudinal ultrasonic sensor, temperature sensor, and deformation monitoring sensor.

The present disclosure has the following benefits. The present disclosure simulates the environmental characteristics of a deep in-situ rock and places the rock sample in the high-fidelity sample chamber. By applying a corresponding pressure and a high temperature to the rock sample, the present disclosure simulates the environmental characteristics (in-situ pressure, temperature, pore pressure) at a certain depth of the formation, which can be adjusted and maintained for a long time according to the depth of the formation. By designing the lift cylinder that drives the coring drill to conduct coring action on the rock sample, the present disclosure simulates the coring condition of the coring drill in the formation and the change of the coring process of the coring drill in the high-temperature and high-pressure environment. By carrying out indoor experimental simulation for coring by the high-fidelity coring device in the simulator, the present disclosure can effectively verify and calibrate the deep in-situ coring system before it is applied to on-site scientific drilling, thus easing the exploration of the deep underground environment and study of the mechanical behavior of the deep rock mass.

Figure 1:
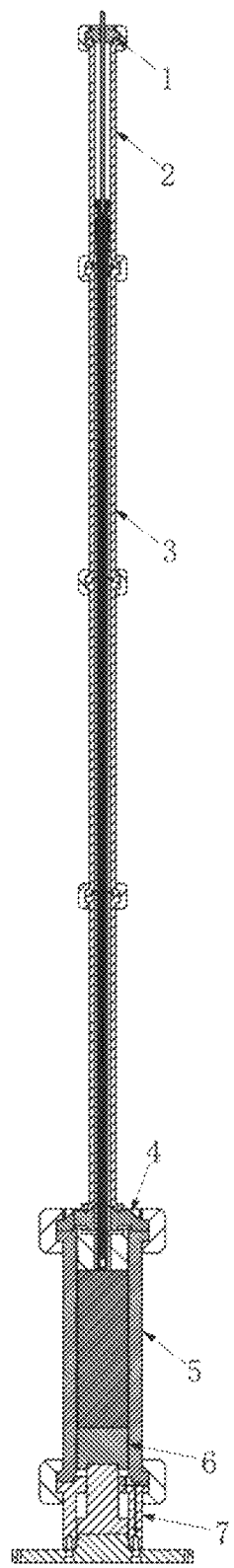
FIG. 1 is a structural diagram of a high-temperature and high-pressure simulator for a deep in-situ environment.

Reference Numerals: 1. upper end cap; 2. lift cylinder; 3. coring drill chamber; 4. central end cap; 5. high-fidelity sample chamber; 6. rock sample seat; 7. bottom cylinder; 8. piston rod; 9. base; 10. slot; 11. rock sample cap; 12. second convex ring; 13. third convex ring; 14. first convex ring; 15. coring drill; 16. lift rod; 17. lift piston; 18. connection space; and 19. expansion part.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Figure 2:
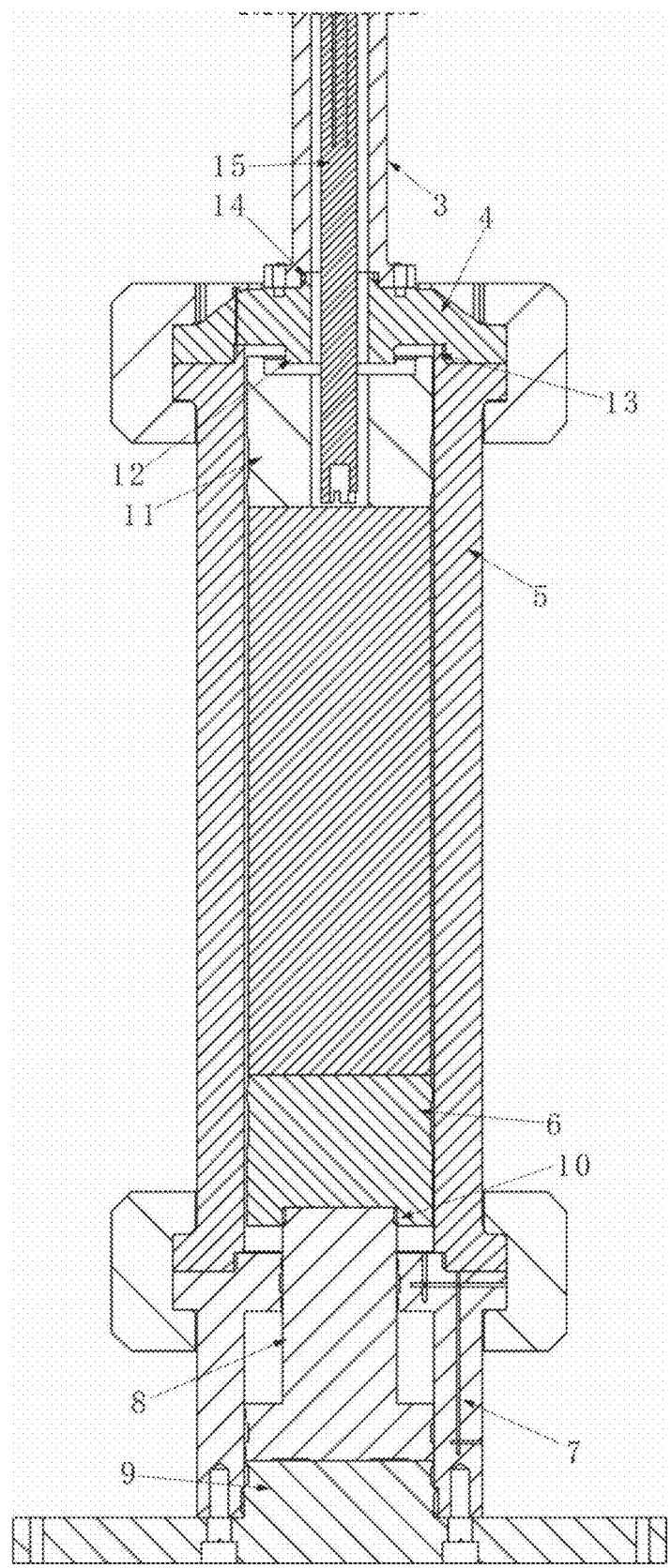
FIG. 2 is a structural diagram of a high-fidelity sample chamber.
Figure 3:
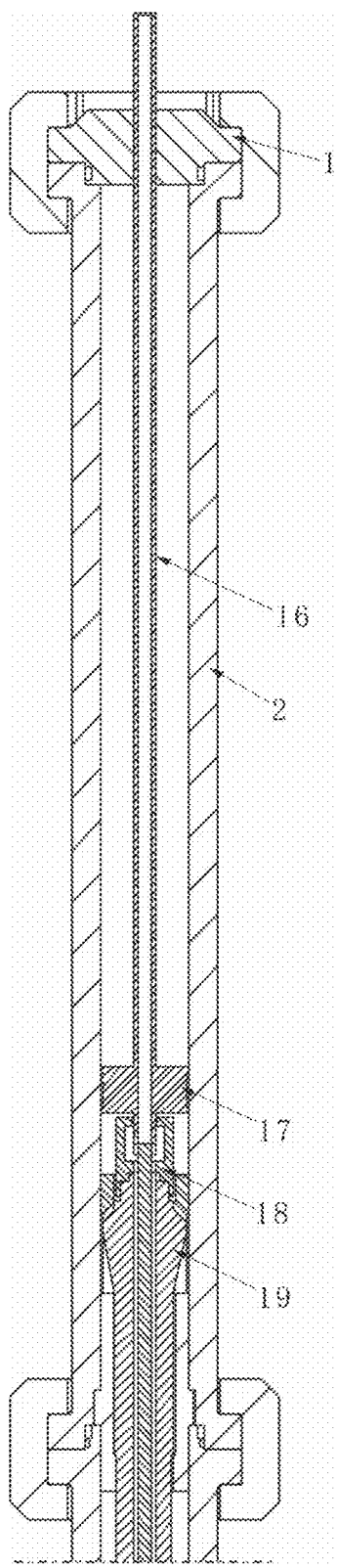
FIG. 3 is a structural diagram of a lift cylinder.
Figure 4:
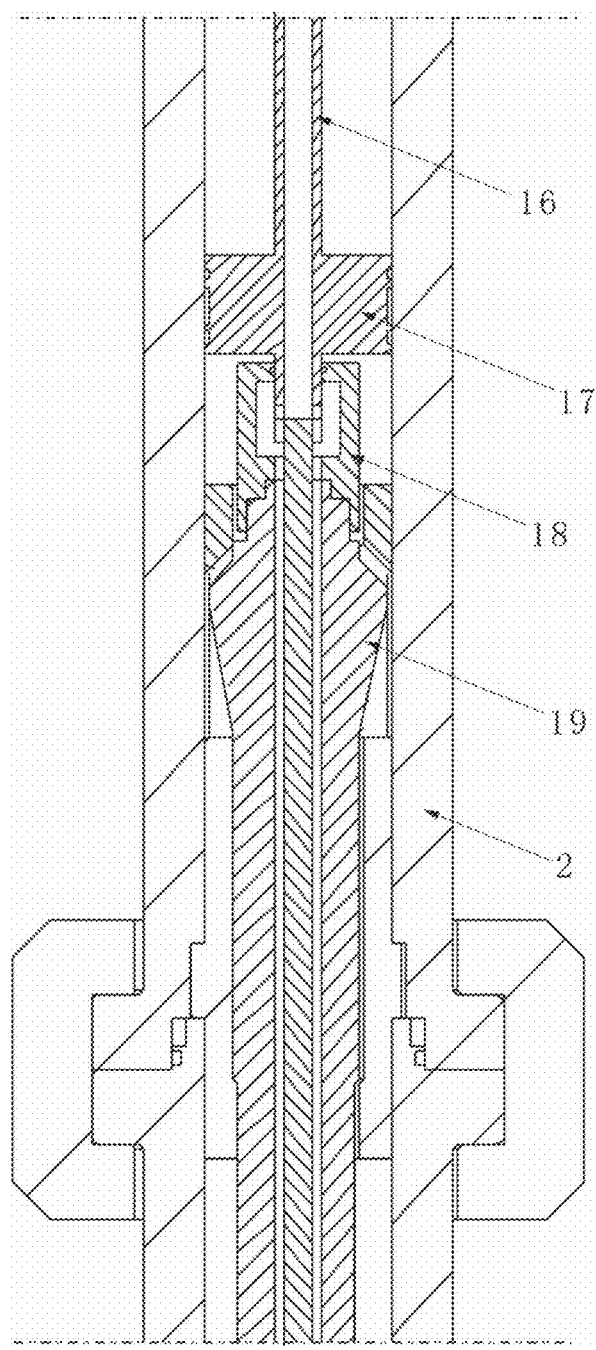
FIG. 4 is a structural diagram of a coring drill and a lift rod that are connected to each other.

As shown in FIGS. 1 to 4, in a solution, a high-temperature and high-pressure simulator for a deep in-situ environment includes high-fidelity sample chamber 5. A lower end of the high-fidelity sample chamber 5 is provided with bottom cylinder 7. A lower end of the bottom cylinder 7 is provided on base 9. Piston rod 8 of the bottom cylinder 7 extends into the high-fidelity sample chamber, and an upper end of the piston rod 8 is provided with rock sample seat 6. An upper end of the high-fidelity sample chamber 5 is provided with rock sample cap 11. A rock sample is placed between the rock sample seat 6 and the rock sample cap 11. The bottom cylinder 7 drives the rock sample seat 6 to apply pressure to squeeze the rock sample, thus realizing a high-pressure environment.

The top of the high-fidelity sample chamber 5 is sealed by an end cap of the high-fidelity sample chamber. An upper end of the end cap of the high-fidelity sample chamber is provided with multi-section coring drill chamber 3. The uppermost section of the coring drill chamber 3 is connected to lift cylinder 2. Coring drill 15 is provided in the coring drill chamber 3. The coring drill 15 extends into the high-fidelity sample chamber through a central end cap 4. The upper end of the lift cylinder 2 is sealed by upper end cap 1.

The lift cylinder 2 is provided therein with lift rod 16. The lift rod 16 has a lower end provided with lift piston 17 and fixedly connected to an upper end of the coring drill 15 and an upper end passing through the upper end cap 1.

The upper end of the lift cylinder 2 is provided with a step for placing the upper end cap 1. The lower end of the upper end cap 1 is inserted into the lift cylinder 2, and a sealing ring is provided between the lower end of the upper end cap 1 and a side surface of the step. The upper end cap 1 is clamped with the upper end of the lift cylinder 2 through a C-shaped clip. The upper end cap 1 seals the lift cylinder 2.

The upper end of the coring drill 15 is provided with expansion part 19. The upper end of the expansion part 19 is provided with a stepped connection piece. The upper end of the connection piece is provided with a connection space 18. The connection piece is inserted into the lower end of the connection space 18, and the lower end of the lift rod 16 is inserted into the connection space 18. The expansion part 19 ensures the connection strength so the connection piece is firmly connected to the connection space 18.

The outer circumference of the lift piston 17 is provided with a sealing ring, and the sealing ring is mated with an inner wall of the lift cylinder 2 and nested in a limit groove of the lift piston 17. It is necessary to ensure the two-way sealing of the lift cylinder 2 and the coring drill chamber 3 to prevent clean water in the coring drill chamber 3 from entering the lift cylinder 2 and hydraulic oil in the lift cylinder 2 from entering the coring drill chamber 3. For this reason, a dedicated one-way or two-way sealing structure (static sealing ring) is adopted, including a clamping groove mated with a fluororubber O-ring and an arc-shaped retaining ring. An arc-shaped side of the arc-shaped retaining ring is adapted to the O-ring to keep the shape unchanged under the action of high pulsating pressure.

Adjacent upper and lower ends of each two adjacent sections of the coring drill chamber 3, as well as an upper end of the uppermost section of the coring drill chamber 3 and a lower end of the lift cylinder 2, and the central end cap 4 and the high-fidelity sample chamber 5, are clamped with each other through a C-shaped clip to achieve rapid disassembly and assembly.

The upper end of the central end cap 4 is provided with a mounting surface. The lower end of the lowermost section of the coring drill chamber 3 is fixed on the mounting surface. The central part of the mounting surface is provided with first convex ring 14 extending into the coring drill chamber 3. The sealing ring is provided between the side surface of the first convex ring 14 and the inner wall of the coring drill chamber 3. The design realizes a seal for the high-fidelity sample chamber 5 and ensures the stable mounting of the coring drill chamber 3.

The lower surface of the central end cap 4 is provided with an annular groove. The central part of the annular groove is provided with second convex ring 12. The second convex ring 12 extends into a limit groove starting from the upper end of the rock sample cap 11. The upper end of the high-fidelity sample chamber 5 is provided with third convex ring 13 extending into the annular groove. A sealing ring is provided between a side surface of the third convex ring 13 and a side surface of the annular groove.

The upper end of the base 9 is provided with a boss inserted into the bottom cylinder 7. The lower end of the piston rod 8 is provided with a cylinder piston. A sealing ring is provided between the cylinder piston and the inner wall of the bottom cylinder 7, as well as between the boss and the inner wall of the bottom cylinder 7.

The upper end of the piston rod 8 is inserted into slot 10 provided at the lower end of the rock sample seat 6. The piston rod 8 is in interference fit with the slot 10 to avoid relative rotation between the piston rod 8 and the rock sample seat 6. The high-fidelity sample chamber 5 is provided therein with multiple sensors, such as an acoustic emission sensor, transverse ultrasonic sensor, longitudinal ultrasonic sensor, and deformation monitoring sensor. The high-fidelity sample chamber 5 can be used to simulate basic physical and mechanical properties of rock samples to be drilled at different depths and conduct tracking tests and can preliminarily realize the pseudo-triaxial simulation of the deep in-situ stress, temperature, and pore pressure.

This solution simulates the environmental characteristics of a deep in-situ rock and places the rock sample in the high-fidelity sample chamber 5. By applying a corresponding pressure and a high temperature to the rock sample, the solution simulates the environmental characteristics (in-situ pressure, temperature, pore pressure) at a certain depth of the formation, which can be adjusted and maintained for a long time according to the depth of the formation. By designing the lift cylinder 2 that drives the coring drill 15 to conduct coring action on the rock sample, the solution simulates the coring condition of the coring drill 15 in the formation and the change of the coring process of the coring drill 15 in the high-temperature and high-pressure environment. By carrying out indoor experimental simulation for coring by the high-fidelity coring device in the simulator, the solution can effectively verify and calibrate the deep in-situ coring system before it is applied to on-site scientific drilling, thus easing the exploration of the deep underground environment and study of the mechanical behavior of the deep rock mass.

What is claimed is:

1. A high-temperature and high-pressure simulator for a deep in-situ environment, comprising a high-fidelity sample chamber, wherein
    a lower end of the high-fidelity sample chamber is provided with a bottom cylinder;
    a lower end of the bottom cylinder is provided on a base;
    a piston rod of the bottom cylinder extends into the high-fidelity sample chamber, and an upper end of the piston rod is provided with a rock sample seat;
    an upper end of the high-fidelity sample chamber is provided with a rock sample cap;
    a top of the high-fidelity sample chamber is sealed by an end cap of the high-fidelity sample chamber;
    an upper end of the end cap of the high-fidelity sample chamber is provided with a multi-section coring drill chamber;
    an uppermost section of the coring drill chamber is connected to a lift cylinder;
    a coring drill is provided in the multi-section coring drill chamber, and the coring drill extends into the high-fidelity sample chamber through a central end cap;
    an upper end of the lift cylinder is sealed by an upper end cap;
    the lift cylinder is provided therein with a lift rod; and
    the lift rod has a lower end provided with a lift piston and fixedly connected to an upper end of the coring drill, and an upper end passing through the upper end cap; wherein
    the upper end of the coring drill is provided with an expansion part;
    an upper end of the expansion part is provided with a stepped connection piece;
    an upper end of the connection piece is provided with a connection space;
    the connection piece is inserted into a lower end of the connection space; and
    a lower end of the lift rod is inserted into the connection space.

2. The high-temperature and high-pressure simulator for the deep in-situ environment according to claim 1, wherein
    the upper end of the lift cylinder is provided with a step for placing the upper end cap;
    a lower end of the upper end cap is inserted into the lift cylinder;
    a sealing ring is provided between the lower end of the upper end cap and a side surface of the step; and
    the upper end cap is clamped with the upper end of the lift cylinder through a C-shaped clip.

3. The high-temperature and high-pressure simulator for the deep in-situ environment according to claim 1, wherein
    an outer circumference of the lift piston is provided with a sealing ring; and
    the sealing ring is mated with an inner wall of the lift cylinder and nested in a limit groove of the lift piston.

4. The high-temperature and high-pressure simulator for the deep in-situ environment according to claim 1, wherein adjacent upper and lower ends of each two adjacent sections of the coring drill chamber, as well as an upper end of the uppermost section of the coring drill chamber and a lower end of the lift cylinder, and the central end cap and the high-fidelity sample chamber, are clamped with each other through a C-shaped clip.

5. The high-temperature and high-pressure simulator for the deep in-situ environment according to claim 1, wherein
    an upper end of the central end cap is provided with a mounting surface;
    a lower end of a lowermost section of the coring drill chamber is fixed on the mounting surface;
    a central part of the mounting surface is provided with a first convex ring extending into the coring drill chamber; and
    a sealing ring is provided between a side surface of the first convex ring and an inner wall of the coring drill chamber.

6. The high-temperature and high-pressure simulator for the deep in-situ environment according to claim 1, wherein
    a lower surface of the central end cap is provided with an annular groove;
    a central part of the annular groove is provided with a second convex ring, wherein the second convex ring extends into a limit groove starting from an upper end of the rock sample cap;
    the upper end of the high-fidelity sample chamber is provided with a third convex ring extending into the annular groove; and
    a sealing ring is provided between a side surface of the third convex ring and a side surface of the annular groove.

7. The high-temperature and high-pressure simulator for the deep in-situ environment according to claim 1, wherein
    an upper end of the base is provided with a boss, and the boss is inserted into the bottom cylinder; a lower end of the piston rod is provided with a cylinder piston; and
    a sealing ring is provided between the cylinder piston and an inner wall of the bottom cylinder, as well as between the boss and the inner wall of the bottom cylinder.

8. The high-temperature and high-pressure simulator for the deep in-situ environment according to claim 1, wherein the upper end of the piston rod is inserted into a slot provided at a lower end of the rock sample seat; and the piston rod is in interference fit with the slot.

9. The high-temperature and high-pressure simulator for the deep in-situ environment according to claim 1, wherein the high-fidelity sample chamber is provided therein with multiple sensors, comprising an acoustic emission sensor, a transverse ultrasonic sensor, a longitudinal ultrasonic sensor, and a deformation monitoring sensor.

10. A high-temperature and high-pressure simulator for a deep in-situ environment, comprising a high-fidelity sample chamber, wherein a lower end of the high-fidelity sample chamber is provided with a bottom cylinder;

a lower end of the bottom cylinder is provided on a base;

a piston rod of the bottom cylinder extends into the high-fidelity sample chamber, and an upper end of the piston rod is provided with a rock sample seat;

an upper end of the high-fidelity sample chamber is provided with a rock sample cap;

a top of the high-fidelity sample chamber is sealed by an end cap of the high-fidelity sample chamber;

an upper end of the end cap of the high-fidelity sample chamber is provided with a multi-section coring drill chamber;

an uppermost section of the coring drill chamber is connected to a lift cylinder;

a coring drill is provided in the multi-section coring drill chamber, and the coring drill extends into the high-fidelity sample chamber through a central end cap;

an upper end of the lift cylinder is sealed by an upper end cap;

the lift cylinder is provided therein with a lift rod; and the lift rod has a lower end provided with a lift piston and fixedly connected to an upper end of the coring drill, and an upper end passing through the upper end cap;

wherein a lower surface of the central end cap is provided with an annular groove;

a central part of the annular groove is provided with a second convex ring, wherein the second convex ring extends into a limit groove starting from an upper end of the rock sample cap;

the upper end of the high-fidelity sample chamber is provided with a third convex ring extending into the annular groove; and a sealing ring is provided between a side surface of the third convex ring and a side surface of the annular groove.

* * * * *